(12) United States Patent
Yilmaz et al.

(10) Patent No.: US 7,647,528 B2
(45) Date of Patent: Jan. 12, 2010

(54) PROBLEM DETERMINATION VIA MODEL-BASED DEBUGGING

(75) Inventors: Cemal Yilmaz, West Harrison, NY (US); Clay E Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 11/696,047

(22) Filed: Apr. 3, 2007

(65) Prior Publication Data

US 2008/0250273 A1    Oct. 9, 2008

(51) Int. Cl.
*G06F 11/00*    (2006.01)
(52) U.S. Cl. .......................... 714/38; 717/130
(58) Field of Classification Search ............. 714/38; 717/130
See application file for complete search history.

(56) References Cited

U.S. PATENT DOCUMENTS

| | | | |
|---|---|---|---|
| 6,996,805 B2 * | 2/2006 | Achlioptas et al. | 717/124 |
| 7,089,534 B2 * | 8/2006 | Hartman et al. | 717/125 |
| 2007/0168924 A1 * | 7/2007 | Kirby | 717/104 |
| 2008/0172576 A1 * | 7/2008 | Kusko et al. | 714/33 |

OTHER PUBLICATIONS

Zeller, A. and Hildebrandt, R., 2002, "Simplifying and Isolating Failure-Inducing Input," IEEE Trans. Sfotw. Eng. 28, 2(Feb. 2002), 183-200.

Zeller, A., 2002, "Isolating Cause-Effect Chains from Computer Programs," Proceedings of the 10th ACM SIGSOFT Symposium on Foundations of Software Engineering (Charleston, South Carolina, USA, Nov. 18-22, 2002), SIGSOFT '02/FSE-10. ACM Press, New York, NY 1-10.

Liblit, B., Naik, M., Zheng, A. X., Aiken, A., and Jordan, M.I., 2005. "Scalable Statistical Bug Isolation," Proceedings of the 2005 ACM SIGPLAN Conference on Programming Language Design and Implementation (Chicago, IL, USA, Jun. 12-15, 2005). PLDI '05. ACM Press, New York, NY, 15-26.

Liblit, B., Aiken, A., Zheng, A.X., and Jordan, M.I., 2003. "Bug Isolation Via Remote Program Sampling," Proceedings of the ACM SIGPLAN 2003 Conference on Programming Language Design and Implementation (San Diego, California, USA, Jun. 9-11, 2003). PLDI '03. ACM Press, New York, NY, 141-154.

Abramson, D., Foster, I., Michalakes, J., and Sosic, R., 1995. "Relative Debugging and its Application to the Development of Large Numerical Models," Proceedings of the 1995 ACM/IEEE Conference on Supercomputing (Cdrom)—vol. 00 (San Diego, California, United States, Dec. 4-8, 1995). Supercomputing '95 ACM Press, New York, NY, 51.

(Continued)

*Primary Examiner*—Bryce P Bonzo
(74) *Attorney, Agent, or Firm*—Michael J. Buchenhorner; Vazken Alexanian

(57) ABSTRACT

A method for automated software debugging includes steps of: receiving an interface configured for accessing a program; receiving a behavioral model of the program; receiving a failing input sequence from the program; executing the failing input sequence on both the behavioral model and the program; validating, after each executing step, an expected behavior of the program by executing specially constructed test sequences from the behavioral model; performing model mutation for creating a hypothesis of faulty behaviors; verifying hypothesized faulty behaviors; and scoring hypothesized faulty behaviors for producing a ranked list of diagnoses. The method also includes a step of presenting the ranked list of diagnoses to a user.

20 Claims, 7 Drawing Sheets

OTHER PUBLICATIONS

Hangal, S. and Lam, M.S., 2002, "Tracking Down Software Bugs Using Automatic Anomaly Detection," Proceedings of the 24th International Conference on Software Engineering (Orlando, Florida, May 19-25, 2002). ICSE '02. ACM Press, New York, NY 291-301.

* cited by examiner

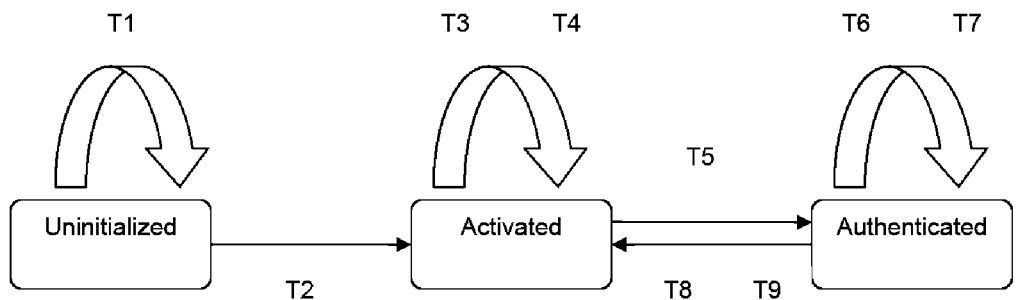

T1: activate(amt), amt > MAXBAL/err(INV_PARAM)
T2: activate(amt), amt <= MAXBAL/ack, bal=amt
T3: authenticate(pin), pin!=PIN && tries < 2/err(INV_PIN), tries++
T4: authenticate(pin), tries >2 ||(pin!=PIN && tries=2/err(PURSE_LOCKED)
T5: authenticate(pin), pin=PIN && tries <= 2/ack, tries=0
T6: deposit(amt), bal + amt > MAXBAL/err(INV_PARAM)
T7: withdraw(amt), bal − amt < 0/err(INV_PARAM)
T8: deposit(amt), bal + amt <= MAXBAL/ack(OK), bal+=amt
T9: withdraw(amt), bal − amt >= 0/ack(OK), bal-=amt

MIS - Modifying Initial Configurations
710

MDT - Deleting Transitions
720

MTS - Modifying Tail States
730

MDU - Deleting Updates
740

MMU - Modifying Updates
750

MAU - Introducing Updates
760

MMC - Modifying Context Parameters
770

*FIG. 7*

PROBLEM DETERMINATION VIA MODEL-BASED DEBUGGING

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of software testing and more particularly relates to the field of model-based debugging of program failures.

BACKGROUND OF THE INVENTION

Program debugging is the process of identifying and fixing software bugs. Debugging is a difficult and time-consuming task. Various software methodologies have been presented to simplify this sometimes arduous task. At a high level, debugging is composed of three steps: observing symptoms, identifying root cause(s), and then fixing and testing. Among these steps, identifying the root causes is the most difficult, thus the most expensive, step of all. The space of potential root causes for failures is often proportional to the size and complexity of programs and almost always too large to be explored exhaustively. Developers often take a slice of the statements involved in a failure, hypothesize a set of potential causes in an ad hoc manner, and iteratively verify and refine their hypotheses until root causes are located. Obviously, this process can be quite tedious and time-consuming. Furthermore, the lack of access and/or familiarity to the source code can severely hinder the developers' ability to anticipate a "good" set of hypotheses and verify them.

Debugging tools all have the same ultimate goal—to narrow down the potential root causes for developers; but they have different ways to achieve that goal. These different approaches often leverage static and dynamic program analysis to detect anomalies or dependencies in the code, with one notable exception, namely Delta Debugging. [See Andreas Zeller, "Isolating Cause-Effect Chains from Computer Programs," Proc. ACM SIGSSOFT, 10$^{th}$ International Symposium on the Foundations of Software Engineering (FSE-10), Charleston, S.C., November 2002]. Delta debugging is different in the sense that it is empirical. The fault localization information provided by current state-of-the-art techniques is often in the form of slices of program states that may lead to failures or slices of automatically identified likely program invariants that are violated or slices of the code that look suspicious.

Although these approaches can be quite effective, they suffer from three major limitations: 1) an inability to deal with conceptual errors; 2) requirement for both one passing and one failing run of a test case to perform debugging; and 3) a dependence on access to source code or binaries. Current approaches mainly target coding errors. They may not track down missing and/or misinterpreted program requirements.

Note that we define a failure as the inability of a system or component to perform its required function. For example, consider the functional requirements of the deposit function for an automated teller machine (ATM). In its simplest form it can be expressed as balance=balance+amt, where balance is the balance of the account and amt is the amount to be deposited. Now assume that the implementation fails to update the balance or fails to commit the updated balance to a database. Tools that rely on static and dynamic analysis may not be able to find it; in general, what is not in the code/execution cannot be analyzed. Empirical tools may not find it either; they often require at least one passing and one failing run in order to perform their functions and in this case there may not be a passing run.

In one form or another, current approaches rely on accessing source code or binaries. However, this is not always possible for programs composed of remote third-party components such as Web Services. In such cases, the quality of results obtained from these tools could be severely degraded. As more and more systems built with commercial off-the-shelf (COTS) components and service-oriented architectures (SOA) are gaining momentum, the importance of being able to debug systems composed of many black-boxes is increasing.

Model-based testing (MBT) is one of the fields that has been extensively leveraging finite state models. In MBT, test cases are automatically derived from a given model and are in the form of an input and output sequence. The program is fed with the input sequence and its output is compared to the expected output. Although matching program and model outputs increases our confidence in the correctness of the program, it is barely adequate. For example, consider the finite state machine (FSM) model (M) given in FIG. 2 and a program (P) attempting to implement this model. P is a black box; its inputs and outputs can be observed, but no other information regarding its condition is known. Now, assume that P incorrectly implements the transition A–a/x→B as A–a/x→C. A legitimate test case (derived from M) to test the original transition is composed of the single input a, assuming that we are already in A. Although P gives the expected output when fed with a, a leaves P in a wrong state, which can manifest itself later as a failure. Therefore, the state of P after executing a should also be verified.

There is a need for a method of program debugging to overcome the shortcomings of the prior art.

SUMMARY OF THE INVENTION

Briefly, according to an embodiment of the invention a method for automated software debugging includes steps or acts of receiving an interface configured for accessing a program; receiving a behavioral model of the program; receiving a failing input sequence from the program; executing the failing input sequence on both the behavioral model and the program; validating, after each executing step, an expected behavior of the program by executing specially constructed test sequences extracted from the behavioral model; performing model mutation for creating a hypothesis of faulty behaviors; verifying hypothesized faulty behaviors; and scoring hypothesized faulty behaviors for producing a ranked list of diagnoses. The method also includes a step of presenting the ranked list of diagnoses to a user.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 1 is an EFSM application of the electronic purse model, written for the Java card platform, according to the known art;

FIG. 7 is a listing of mutation operators which can be advantageously used by an embodiment of the present invention.

Figure 2:
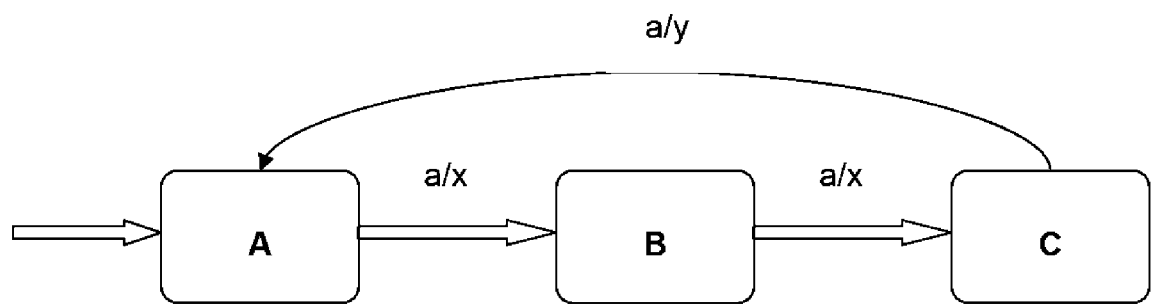
FIG. 2 is an illustration of a finite state machine model, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a solution to the problem of determining the likely location and type of failure in a piece of code once a test case fails. We call this solution automated model-based debugging (MBD). It is a black-box technique based on models. Rather than focusing on how a program behaves by analyzing the source code and/or execution traces, MBD concentrates on how the program should behave with respect to a given behavioral model. For a given failure, the ultimate goal of MBD is to help developers reduce the space of potential root causes for the failure. By doing that, MBD aims at reducing the turn-around time for bug fixes. This is done by identifying and verifying the slices of program behavior as indicated by its behavioral model that, once implemented wrong, can potentially lead to the failure. Not only do we identify functional differences between the program and its model, but we also provide a ranked list of diagnoses which might explain (or be associated with) these differences.

MBD is a purely empirical and black-box technique. It takes as input an interface for accessing a program (or the program itself), the program's behavioral model, and a failing input sequence from the program. The behavioral model may be an extended finite state machine (EFSM), a flow chart, message flow chart, and so on. In a sense, MBD simulates the role of a human debugger. We hypothesize what might have gone wrong with the program and led to the failure and then verify and score our hypotheses according to how well they demonstrate the actual erroneous program behavior. Our hypotheses are constructed by mutating the behavioral model of the program. Each mutant represents a faulty behavior that the program may erroneously demonstrate. The verification of a hypothesis is performed by extracting a special purpose input/output sequence from the behavioral model, called a confirming sequence, and testing it on the program. Our experiments suggest that MBD can effectively reduce the space of potential root causes for failures, which can, in turn, improve the turn-around time for bug fixes.

The advantages of MBD are: 1) it requires only the failing run; 2) it does not depend on having access to either source code or binaries for analysis/instrumentation; and 3) it can target errors beyond coding errors, such as functional requirements errors.

MBD System.

Figure 3:
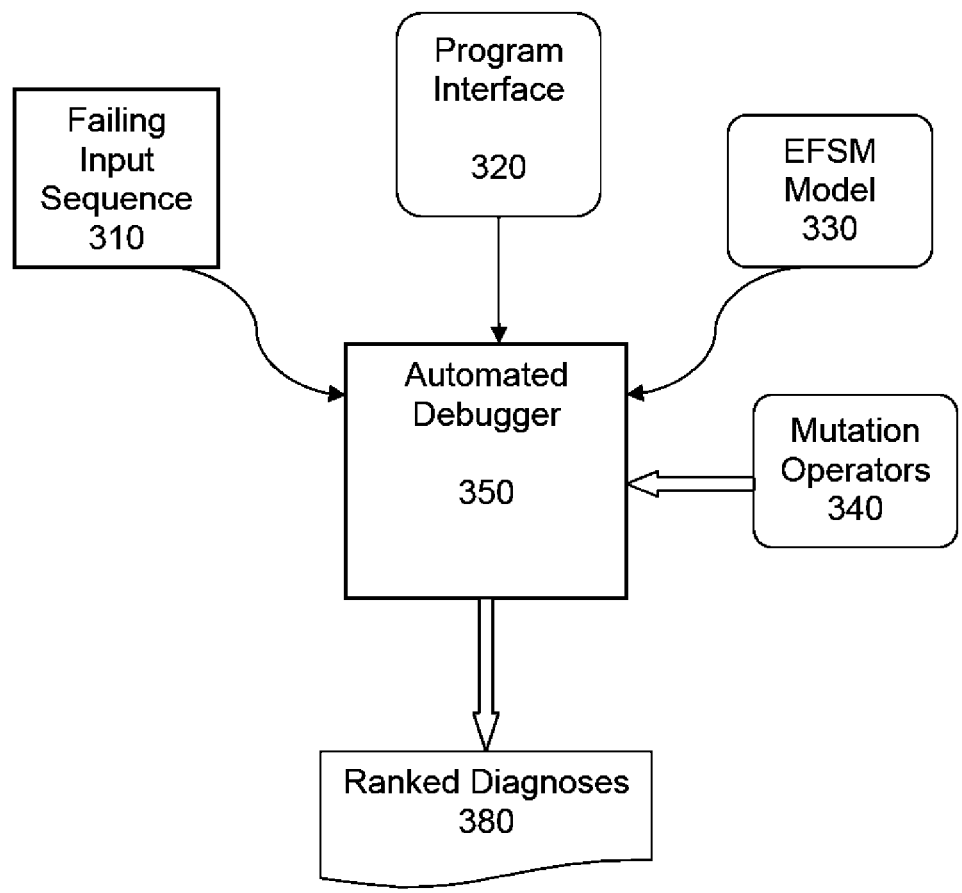
FIG. 3 is a simplified illustrative depiction of automated model-based debugging, according to an embodiment of the present invention.

Referring to FIG. 3 there is shown a simplified illustrative depiction of automated model-based debugging, according to an embodiment of the present invention. The automated debugger 350 is a software tool which can be implemented on an information processing system. The required inputs are: a failing input sequence 310; the program or an interface to the program 320 causing the failure run; and an behavioral model 330. In this example we use an ESFM. The output is a listing of ranked diagnoses 380. Mutators 340 are used by the debugger 350.

Figure 4:
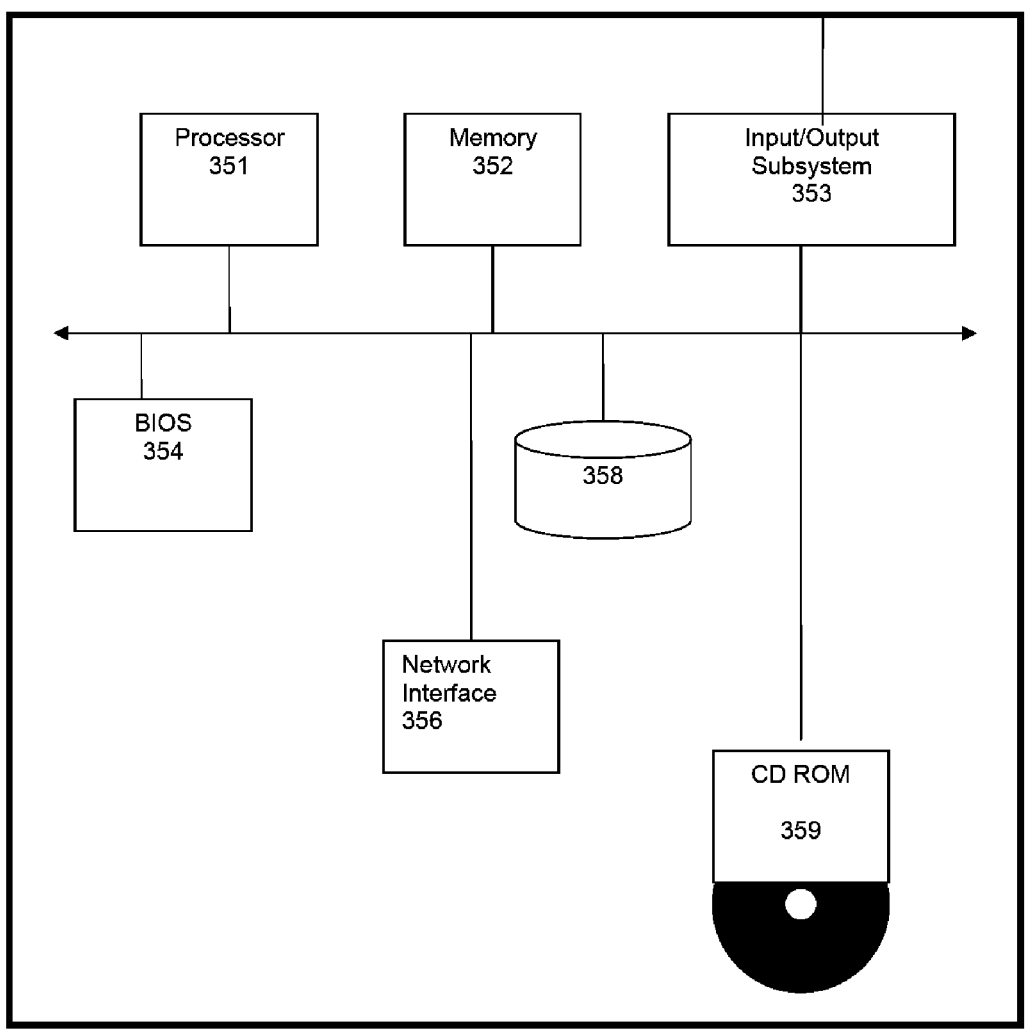
FIG. 4 is a block diagram of an information processing system configured to operate according to the model-based debugger of FIG. 3, according to an embodiment of the present invention.

Referring to FIG. 4, there is shown a simplified block diagram of an information handling system configured to operate as the MBD debugging tool 350, according to an embodiment of the invention. The computer system 350 may be a stand-alone device or networked into a larger system. The system 350 could include a number of operators and peripheral devices as shown, including a processor 351, a memory 352, and an input/output (I/O) subsystem 353. The processor 351 may be a general or special purpose microprocessor operating under control of computer program instructions executed from a memory 352. The processor 351 may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions.

The memory 352 represents either a random-access memory or mass storage. It can be volatile or non-volatile. The system 350 can also comprise a magnetic media mass storage device 358 such as a hard disk drive. The I/O subsystem 353 may comprise various end user interfaces such as a display, a keyboard, and a mouse. The I/O subsystem 353 may further comprise a connection to a network such as a local-area network (LAN) or wide-area network (WAN) such as the Internet.

According to an embodiment of the invention, a computer readable medium, such as a CDROM 359 can include program instructions for operating the programmable computer 350 according to the invention. What has been shown and discussed is a highly-simplified depiction of a programmable computer apparatus. Those skilled in the art will appreciate that other low-level components and connections are required in any practical application of a computer apparatus.

MBD General.

MBD is a completely black-box technique. The only requirement is a way to map the model inputs/outputs to the actual program inputs/outputs. We don't make any assumption about how the program 320 actually implements the model 330. For instance, model states and transitions can be abstract and implemented either implicitly or explicitly in the program 320. However, we rely on competent specifier hypotheses, which states that the specifier of a program behavior is likely to construct behavioral models close to the correct program behavior. The widespread support for EFSM's in industrially significant specification languages, such as Statecharts, UML, and SDL, suggests that this expectation is a realistic one.

A cornerstone of our approach is a stepwise validation of the program 320 against its behavioral model 330. This allows us to detect faults as close to the time they occur as possible, rather than when they manifest themselves. We execute the failing input sequence 310 stepwise in parallel on both the program 320 and model 330. After each input step, we validate whether the program 320 demonstrates an expected behavior, i.e., whether the program 320 and model 330 outputs match for some specially constructed input sequences. In the case of a failure, by mutating the behavioral model 330, we hypothesize what might have gone wrong with the implementation that led to the failure. The intent behind these mutations 340 is to mimic programmers' typical mistakes, such as miscoded conditions, missing updates, and misinterpreted specifications.

We then validate and score hypothesized faulty behaviors according to how well they demonstrate the actual erroneous program behavior. Validations of expected and anticipated faulty behaviors show resemblances to each other. They are both validated against their mutants 340 by computing confirming sequences. A confirming sequence is composed of an input sequence and the corresponding output sequence. The rationale behind this approach is that if the behavior to be validated demonstrates the actual program behavior, then all confirming sequences computed to distinguish it from its mutants 340 should pass. Given a confirming input/output sequence which separates the behavior to be validated (either expected or faulty) from a mutant 340, if the actual program output, when fed with the confirming input sequence, matches the expected output, then it increases our confidence about the validity of the behavior under investigation. Otherwise (i.e., if the outputs don't match), it is a good indication that the program 320 doesn't demonstrate the expected behavior.

MBD relies on a relative scoring approach for assigning belief to alternate fault hypotheses. Instead of computing a single confirming sequence, we compute pairwise confirming sequences between a behavior and its mutants. A single confirming sequence implies that we expect the program 320 to behave exactly the same way we anticipate it could behave, otherwise the confirming sequence would fail. Pairwise confirming sequences on the other hand, help us score each hypothesized behavior and diagnose faults which are not directly anticipated by the mutations 340.

Confirming Sequences.

From the earlier example of the finite state model used for MBT testing, the question is: Can we verify the current state of the black box P, if all we know about P is its blueprint (model)? An input/output sequence known as a confirming sequence is a solution to the problem. A confirming sequence is a test case that, if passed, increases our confidence in the correctness of the state reached by the program after executing an input. Given a model and a state to be verified, a confirming sequence is extracted directly from the model in a way that distinguishes the state from all the other states in the model.

Going back to our simple example of FIG. 2, we know that, after consuming a, P should be in state B. A confirming sequence that could be computed for state B is (a, a)/(x, y). Note that this sequence separates B from A and C. That is, B is the only state in M that would generate the output (x, y) given the input (a, a). Feeding P with this confirming sequence would reveal that P appears not to be in the expected state, since input (a, a) generates output (y, x). There are well-established algorithmic approaches to compute confirming sequences for FSM models. Extracting confirming sequences from extended finite state models (EFSM) models is a more challenging task though. This is due to the fact that states of EFSM models are parameterized. Extracting a confirming sequence that separates a given configuration (i.e., a state and a valuation of the context parameters) from all other configurations in the model is often computationally impractical because of the combinatorial complexity involved.

One way to ease this complexity is to verify a configuration against a carefully chosen list of suspicious configurations, rather than verifying it against all other configurations. Even if the choice of suspicious configurations may affect the quality of the confirming sequence, experiments suggest that this approach can be quite effective in practice. The suspicious configurations are computed by mutating the original behavorial model of the program 320. The rationale behind these mutations is to mimic programmer's typical mistakes, such as off-by-one errors, as described in detail in the document. Consider the electronic purse application of FIG. 1 written for the Java Card platform as an example. Given an implementation of this model 100, we may want to verify that the implementation starts with the expected initial configuration of [state=uninitialized, bal=0, tries=0] rather than a faulty configuration of [state=uninitialized, bal=0, tries=1]. This faulty configuration is a good candidate for verifying the expected configuration against, since it reflects a typical off-by-one error in the initialization of the variable tries.

One confirming sequence that separates the expected configuration from the faulty one is (activate(5), authenticate(2), authenticate(2), authenticate(2))/(ack, err(INV PIN), err (INV PIN), err(PURSE LOCKED) with the assumption that the model constant PIN is not 2. Note that what we are really verifying here is whether or not the program locks the purse after exactly three unsuccessful authentication attempts, rather than whether the program initializes the variable to 0 or 1. Confirming sequences may not be unique and for some cases they may not even exist. The latter usually happens for machines that are not minimal (i.e., containing identical states). By definition, identical states are indistinguishable. In MBD, we leverage confirming sequences to verify expected behaviors as well as hypothesized failure causes.

EFSM Model.

Figure 6:
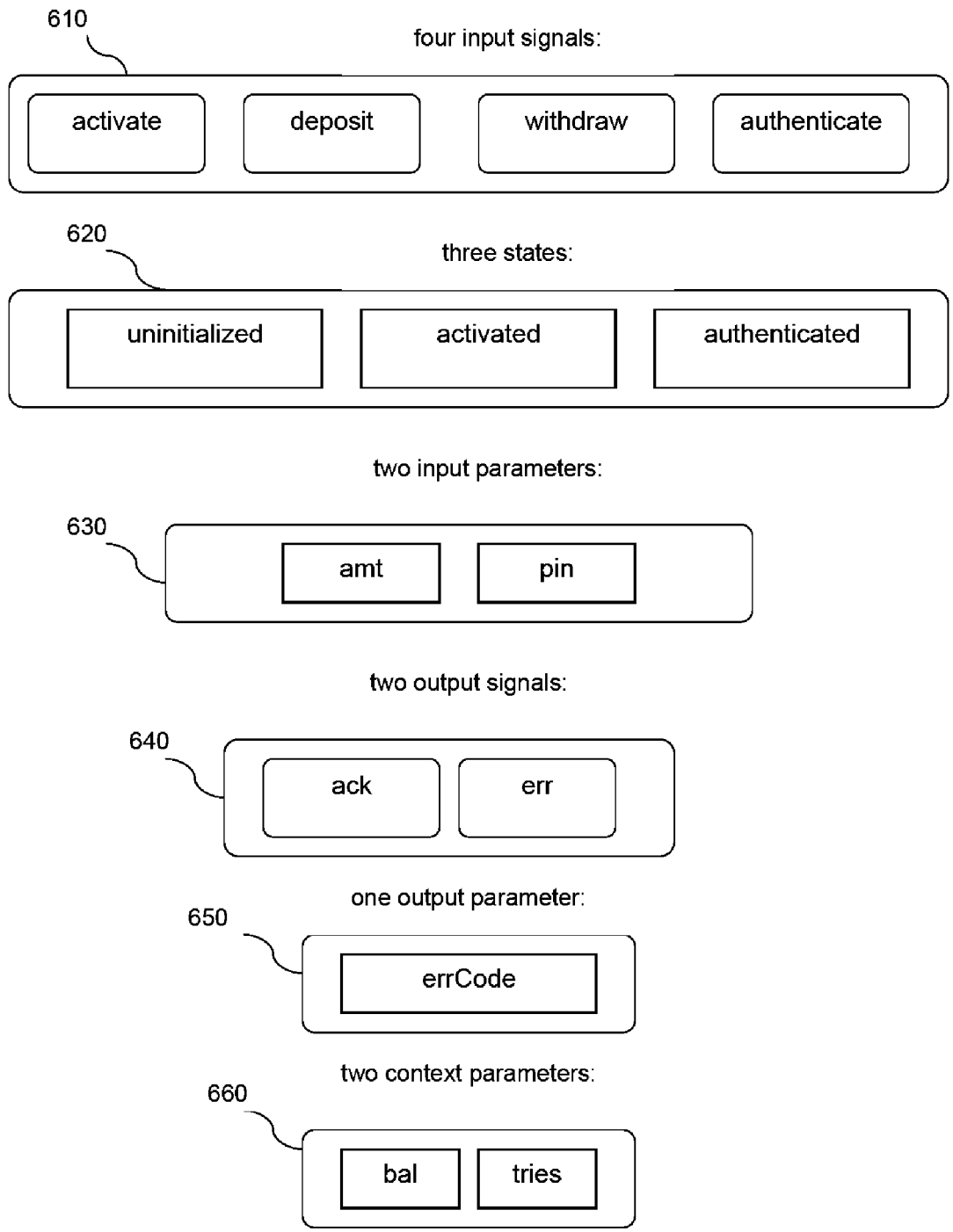
FIG. 6 is an example EFSM model for the electronic purse application of FIG. 1, according to an embodiment of the present invention.

To further explain EFSM, we use an example EFSM model for the electronic purse application of FIG. 1. Referring to FIG. 6 there is shown a graphical depiction of the elements of the EFSM model 600. The basic inputs that this application can receive are: activate(amt), authenticate(pin), deposit (amt), and withdraw(amt). A purse (automated teller machine) first needs to be activated with an initial balance. Once activated, each deposit and withdraw operation must be authenticated with a card specific pin number (represented by the constant PIN in the model). The authentication should be done in at most three attempts, otherwise the purse is locked. In this application, the model contains three states 620: (uninitialized, activated, and authenticated), four input signals 610 (activate, deposit, withdraw, and authenticate), two input parameters 630 (amt and pin), two output signals 640 (ack and err), and one output parameter 650 (errCode).

This model also has two context parameters 660: bal, storing the current balance of the purse, and tries, storing the current number of incorrect authentication attempts. Each transition is denoted by a notation of the form $$s-(i; p/o; f) \rightarrow s'$$

where s and s' are the starting and ending states, i and o are the parameterized input and output signals, p is the predicate, and f is the context update function of the transition. To simplify the notations, we drop update functions from the transitions that have no updates.

A state and a valuation of context parameters constitute a so-called configuration of the EFSM. The EFSM usually starts with a designated initial configuration. For example, our example EFSM starts with the initial configuration of [state=uninitialized, bal=0, tries=0]. A configuration reflects the history of input signals and the updates on context parameters from the system start to the present moment. The EFSM is assumed to be in one of its finitely many configurations at any given time.

The EFSM operates as follows: the machine receives a parameterized input signal 610 and identifies the transitions whose predicates are satisfied for the current configuration. Among these transitions, a single transition is fired. During the execution of the chosen transition, the machine 1) generates an output signal 640 along with the output parameters 650, 2) updates the context variables 660 according to the update function of the transition, and 3) moves from the starting to the ending state of the transition.

Mutation Operators 340.

We hypothesize a set of faulty behaviors that the program may demonstrate via mutating its model. We define a set of simple mutation operators 340. MBD is readily applicable to different sets of mutation operators and mutations based on formal/informal fault models. The choice of our mutation operators 340 is based on two major factors: a desirable mutation operator 340 should be coarse-grained enough to detect as many faults as possible, but yet fine-grained enough to diagnose them. We designed our mutation operators by giving equal importance to these competing factors.

Another consideration was to design orthogonal operators as much as possible. Since we score mutated models with respect to each other, overlapping models may potentially decrease their scores. We enforce the orthogonal design when we can by running simple checks during the application of operators. In the rest of the argument, let M be the model to be mutated, i be the last input consumed by M, C be the resulting configuration of the machine after executing i, and T:s−(i; p/o; f)→s' be the transition taken at i. Referring now to FIG. 7 we describe the following mutation operators 340:

MIS 710—Modifying initial configurations. MIS modifies the initial configuration of the machine by 1) changing the initial state to every other state in M and 2) introducing an error term into the initialization of each context parameter, one at a time. For example, an initialization of the form bal=0 is mutated into bal=0+err, where err ranges over a small interval of positive and negative numbers. Note that the initial configuration here refers to the initial configuration of the machine M, not the starting configuration of the transition T. MIS is designed to verify that the program under study starts with the expected initial configuration.

MDT 720—Deleting transitions. MDT deletes the transition T from the model.

MTS 730—Modifying tail states. MTS changes the tail state s' of T to every other state in M, one at a time.

MDU 740—Deleting updates. MDU modifies the update function f of T by deleting the update operations on the context parameters, one at a time.

MMU 750—Modifying updates. MMU modifies the update function f of T by introducing error terms into each update operation, one at a time. The way we introduce error terms is explained above for the MIS operator.

MAU 760—Introducing updates. MAU introduces additional updates, one at a time, for the context parameters which are not originally updated by the function f of T.

MMC 770—Modifying context parameters. MMC modifies the context parameters in C, one at a time, by introducing error terms. The difference between MMC and MAU is that MMC targets nonsystematic faults by only mutating the current context, whereas MAU targets systematic faults by mutating the underlying machine. For a given transition (T) and a configuration (C), each mutation operator defined above may produce zero, one, or more mutated models. Furthermore, mutation operators 240 that modify the underlying finite automaton also update the context parameters to reflect the modifications.

MBD Steps.

At a high level MBD involves the following steps: 1) execute the failing input sequence stepwise on both the model and program, 2) validate (after each input step) the expected behavior of the program by executing specially constructed test sequences (i.e., confirming sequences) from the EFSM model, 3) hypothesize, (in the case of a failure) via model mutation what might have been wrong in the implementation and lead to the failure, and 4) validate and score hypothesized faulty behaviors according to how well they demonstrate the actual erroneous program behavior. The result is a ranked list of diagnoses given as a slice of the model which might explain (or be associated with) what the program implemented incorrectly, leading to the failure.

Figure 5:
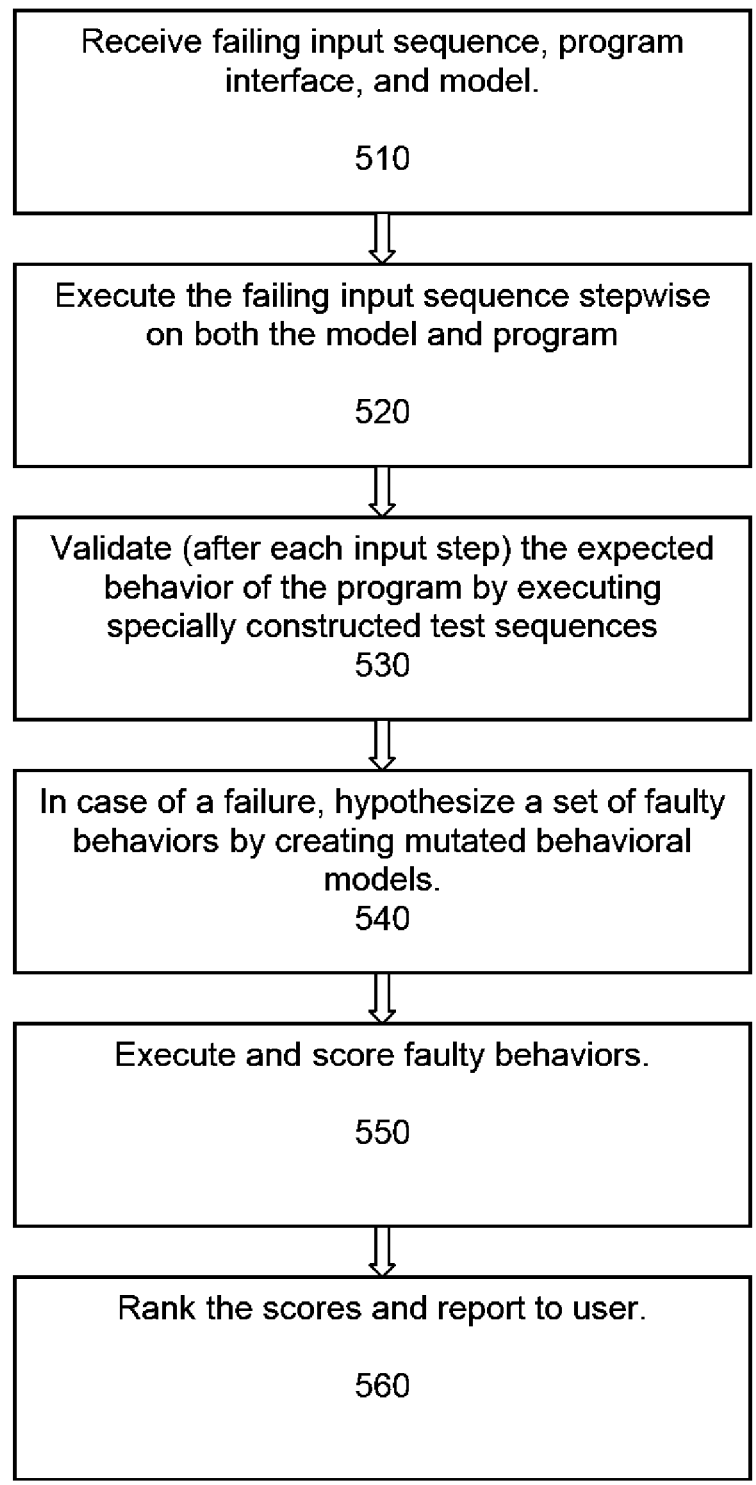
FIG. 5 is a flow chart of the process for automated model-based debugging, according to an embodiment of the present invention.

Referring to FIG. 5 there is shown a flow chart 500 for the MBD process steps. The process begins at step 510 with receipt of the following inputs: a failing input sequence; the program giving rise to the input sequence or an interface to the program; and the behavioral model. Note that it is only necessary to have access to the program or at least a portion of the program. The method does not need to receive the program itself. In step 520, the debugger 450 performs the stepwise validation of the expected and hypothesized faulty program behaviors. The stepwise validation of the expected behavior allows us to detect faults as close to the time they occur as possible, rather than when they manifest themselves externally.

Next in step 530 the debugger 350 performs the validation steps by automatically extracting confirming input/output sequences from the behavioral model. In a nutshell, a confirming sequence is a test case that separates an expected behavior from a faulty one. If the program output matches the expected output of a confirming sequence when it is run on the sequence, then it increases our confidence about the correctness of the program. Otherwise (i.e., if the outputs don't match), it is a good indication that the program doesn't demonstrate the expected behavior.

Step 540: In the case of a failure, we hypothesize (by mutating the behavioral model) to create a set of possible faulty behaviors that the program may erroneously demonstrate. The choice of our mutation operators is based on two major factors: a desirable mutation operator should be coarse-grained enough to detect as many faults as possible, but yet fine-grained enough to diagnose them. As stated earlier, some mutation operators are MIS 710, MDT 720, MTS 730, MDU 740. We give equal importance to these competing factors. We then ask the question: Which of the anticipated faulty behavior(s) better demonstrates the erroneous program behavior?

Step 550: The way we answer this question is identical to the way we validate the expected behavior, only this time each faulty behavior, in turn, becomes the expected behavior of the erroneous program. For example, given a set S of possible faults (as mutated models), we do the following:

For each model s in S:

a. Compute a set P of pairwise confirming input/output sequences on s and all models in S-{s} b. For each sequence p in P i. Execute p on the program, noting whether the output matches that predicted by the sequence p.

c. The score for s is the percentage of the executions of sequences in P that match the program behavior.

Lastly, in step 560 the debugger 350 ranks the scores for all s in S and reports them to the user. Table 1 shows the MBD algorithm used to determine the ranked listing.

TABLE 1

Algorithm 1 MBD (Model M, Program P, Input I)

```
 1:    CI ← { }
 2:    D ← { }
 3:    for all i where i ∈ I do
 4:        T ← M(i)
 5:        O ← P(i)
 6:        F ← mutate(M, T)
 7:        CS ← ComputeConfirmingSequences(M, F)
 8:        if ∀ cs• cs ∈ CS ^ P' (cs.in) = cs.out then
 9:            continue
10:        end if
11:        for all M' where M' ∈ F do
12:            T' ← M' (i)
13:            F' ← mutate(M', T')
14:            CS' ← ComputeConfirmingSequences(M',F')
15:            M' .score ← percentageOf({cs' | cs' ∈ CS' ^
                  P' (cs'.in) = cs'.out})
16:            D ← D U {M'}
17:        end for
18:    end for
19:    return ranked list of M''s where M' ∈ D
```

Computing Confirming Sequences.

In a nutshell, given two EFSM machines along with their current configurations, Petrenko casts the problem of computing a confirming sequence, that separates the first machine from the second, into a reachability problem in the "distinguishing EFSM machine" obtained from cross-producting the given machines in a certain manner. Once we compute the distinguishing EFSM machine, we use a model checker to solve the reachability problem. The negation of the reachability problem is expressed as a branching-time logic formula which should hold globally across all the paths, so that the counter example returned from the model checker (if any) becomes our confirming sequence.

MBD Example.

Using the electronic purse model of FIG. 1 discussed earlier, we apply the MBD approach. In this example, we manually introduce an error into the actual implementation of the authenticate function. When the valid pin is entered, instead of setting the number of failed authentication attempts (i.e., parameter tries in the model) to zero, the implementation now erroneously sets it to one; a typical off-by-one error that requires certain combinations of inputs to detect. The introduced error corresponds to the implementation of the transition T5. We fed the MBD tool 350 with the EFSM model, the faulty implementation, and the input sequence (activate (amt=5), authenticate(pin=1)), with the assumption that the PIN constant in the model is 1. This input sequence is interesting in the sense that the error we introduced is not observable externally through the input sequence provided; the faulty program returns the expected output of (ack, ack).

Since we validate the resulting state of the program regardless of the program output, the error is, in fact, not required to be observable through the provided input sequence. The MBD tool 350 starts by validating whether the program starts with the expected initial configuration of [state=uninitialized, bal=0, tries=0]. The MIS mutation operator 710 provided 6 mutants for this purpose. Six pairwise confirming sequences were automatically extracted, one per mutant, each of which distinguishing the expected initial configuration from a mutant. Confirming sequences were executed on the program and it turned out that the program passed all of them, suggesting that the program starts with the expected initial configuration. The tool then executed the input (activate(amt=5)) on the program.

To validate that the program is now in the expected configuration of [state=activated, bal=5, tries=0], 13 mutants were created. All of the corresponding confirming sequences passed. For each mutant we compute a set of confirming sequences. The input authenticate(pin=1) was executed next. The model transition taken on this input was T5 that moved the machine to the configuration [state=authenticated, bal=5, tries=0]. Several of the 13 confirming sequences computed to validate the current configuration of the program failed, suggesting that the program is not in the expected state after executing the input.

One of the failing confirming sequences, for example, was (withdraw(amt=0), authenticate(pin=3), authenticate (pin=3), authenticate(pin=1), deposit(amt=2), authenticate (pin=3))/(ack, err(INV PIN), err(INV PIN), ack, ack, err(INV PIN)). It was computed to validate the original EFSM with the configuration [state=authenticated, bal=5, tries=0] against a mutant obtained by the MDU operator. The mutant simulated a missing update on tries by mutating the transition T5 to activated ʃauthenticate; pin=PIN& tries·2=ack ! authenticated and keeping the same configuration with the original machine.

There are several things to note here. First, although the confirming sequence failed, it was not decisive of whether the mutant demonstrates the faulty program behavior (in this case it doesn't). Second, the confirming sequence given above is a minimal sequence; no other sequence with less steps performing the same task exists. Last, the main purpose of the withdraw and deposit operations in the sequence is to move back and forth between the activated and authenticated states. The amounts passed as arguments are irrelevant as long as they are valid. The program output was (ack, err(INV PIN), err(PURSE LOCKED), err(PURSE LOCKED), err(INV CMD), err(PURSE LOCKED))1.

The MBD tool 350 then automatically validated and scored each mutant 340. Table 2 shows the top three diagnoses emitted from the tool 350, which were anticipated by the mutation operators, MMU 750, MMC 770, and MMC 770, respectively. To further facilitate the human debugging process, each diagnosis provides detailed information. For example, the first diagnosis reads: After executing the inputs in H, the program should exercise the transition T on the current input I, however the program appears to implement T as T' i.e., with an off-by-one error in updating tries The first diagnosis not only does pinpoint the exact location in the model that the program failed to implement correctly, but also explains exactly how the program erroneously implemented it.

The second diagnosis is implied by the error made in the implementation; having an off-by-one error in updating tries implies that tries will be corrupted in the resulting configuration. The only difference between the first and second diagnoses is that the latter one is obtained by mutating the expected configuration of the model without touching the underlying machine, whereas the former one is computed by mutating the underlying machine. They both got the perfect score. The third diagnosis, although it localizes the error to the exact location in the model, it fails to explain it accurately, which is reflected in its lower score. For example, one of the confirming sequences that didn't support this diagnosis was (withdraw(iAmt=0), authenticate(iP in=3))/(ack, PURSE LOCKED). This sequence was extracted to distinguish the faulty (now expected) model configuration [state=authenticated, bal=5, tries=2] from the expected (now faulty) configuration [state=authenticated, bal=5, tries=0]. The program returned (ack, INV PIN). All the other diagnoses which are not displayed in Table 2 had significantly lower scores.

TABLE 2

Top Three Diagnoses.

| Score | Diagnosis |
|---|---|
| 100.00 | Update on tries appears to be incorrectly implemented!<br>Details: Off-by-one-error<br>Input History (H): active(amt=5)<br>Current Input (I): authenticate(pin=PIN)<br>Model transition taken on I (T): activated /authenticate; pin = PIN&tries · 2=ack; tries =0 ! authenticated<br>T appears to be implemented as T0: activated /authenticate; pin = PIN&tries · 2=ack, tries =0 + 1 ! authenticated |
| 100.00 | tries appears to be corrupted!<br>Details: Off-by-one error<br>Input History (H): active(amt=5)<br>Current Input (I): authenticate(pin=PIN)<br>Model configuration after I (C): [state=authenticated, bal=5, tries=0]<br>Program appears to be in configuration: [state=authenticated, bal=5, tries=0+1] |
| 84.62 | tries appears to be corrupted!<br>Details: Off-by-two error<br>Input History (H): active(amt=5)<br>Current Input (I): authenticate(pin=PIN)<br>Model configuration after I (C): [state=authenticated, bal=5, tries=0]<br>Program appears to be in configuration: [state=authenticated, bal=5, tries=0+2] |

MBD detected the fault which was, in fact, externally unobservable through the provided input sequence and then precisely diagnosed the root cause. MBD can be performed for a fee for clients. Clients can subscribe to MBD as a service and pay a subscription fee. In the alternative, clients can select to pay per use of the system. Transactions would need to be logged and associated with their respective client.

Therefore, while there has been described what is presently considered to be the preferred embodiment, it will understood by those skilled in the art that other modifications can be made within the spirit of the invention.

We claim:

1. A method comprising steps of:
   accessing at least a portion of a program to be debugged;
   accessing a behavioral model of the at least a portion of the program;
   receiving a failing input sequence from the at least a portion of the program;
   executing the failing input sequence stepwise in parallel on both the behavioral model and the at least a portion of the program;
   validating, after each execution, an expected behavior of the at least a portion of the program by executing test sequences constructed from the behavioral model, wherein the test sequences comprise model states and transitions;
   performing model mutation using mutation operators, for creating a hypothesis of faulty program behaviors;
   verifying each faulty program behavior in the hypothesis using the model mutators; and
   assigning a score to each faulty behavior, wherein the score comprises a percentage of executions of confirming sequences that match the faulty program behavior; and
   ranking the scores for producing a ranked list of diagnoses, wherein the diagnoses correspond to the mutation operators.

2. The method of claim 1, wherein performing model mutation comprises:
   selecting at least one of a plurality of mutation operators, wherein the at least one of a plurality of mutation operators represents programming errors; and
   applying the at least one of the plurality of mutation operators to the behavioral model.

3. The method of claim 1, wherein the validating step begins by validating whether the at least a portion of the program starts with an expected initial configuration.

4. The method of claim 1, further comprising a step of:
   presenting the ranked list of diagnoses to a user.

5. The method of claim 1 wherein the verifying step comprises steps of:
   extracting a confirming sequence from the behavioral model; and
   testing the confirming sequence on the at least a portion of the program, wherein the confirming sequence is a special purpose input/output sequence that separate an expected behavior from a faulty one.

6. The method of claim 5 further comprising a step of:
   computing pairwise confirming sequences between a behavior and its mutants, wherein the behavior is at least one selected from a group consisting of: expected behavior and faulty behavior.

7. The method of claim 5 wherein extracting a confirming sequence comprises verifying a configuration against a selected list of suspicious configurations.

8. The method of claim 7 wherein the suspicious configurations are computed by mutating the original behavorial model of the at least a portion of the program.

9. The method of claim 4 further comprising steps of:
   logging inputs and outputs for allocating costs to the user; and
   allocating costs to the user.

10. An information processing system for software debugging, the system comprising:
    data storage for storing inputs, the inputs comprising:
       an interface configured for accessing at least a portion of a program exhibiting faulty behavior,
       a failing input sequence from the at least a portion of the program,
       a behavioral model of the at least a portion of the program, and
       mutation operators;
    a processor configured for performing steps of:
       executing the failing input sequence stepwise in parallel on both the behavioral model and the at least a portion of the program;
       validating, after each execution, an expected behavior of the at least a portion of the program by executing test sequences constructed from the behavioral model, wherein the test sequences comprise model states and transitions;
       performing model mutation using mutation operators, for creating a hypothesis of faulty program behaviors;

verifying each faulty program behavior in the hypothesis using the model mutators; and assigning a score to each faulty behavior, wherein the score comprises a percentage of executions of confirming sequences that match the faulty program behavior; and ranking the scores for producing a ranked list of diagnoses, wherein the diagnoses correspond to the mutation operators; and an input/output subsystem for interacting with a user of the system.

11. The system of claim 10 wherein the input/output subsystem comprises a display for presenting the ranked list of diagnoses to the user.

12. The system of claim 10 wherein the behavioral model is an extended finite state machine.

13. The system of claim 10 wherein the mutation operators are based on programmer errors.

14. The system of claim 10 wherein the behavioral model comprises abstract model states and transitions implicitly implemented in the program.

15. The system of claim 10 wherein the input/output subsystem comprises a network interface.

16. The system of claim 15 wherein the ranked list of diagnoses is viewable through a web browser.

17. The system of claim 10 wherein the behavioral model comprises abstract model states and transitions explicitly implemented in the program.

18. The system of claim 10 wherein the behavioral model comprises abstract model states and transitions implicitly implemented in the program.

19. A computer program product embodied on a computer readable medium and comprising code that, when executed, causes a computer to perform the following:

access at least a portion of a program to be debugged;

access a behavioral model of the at least a portion of the program;

receive a failing input sequence from the at least a portion of the program;

execute the failing input sequence stepwise in parallel on both the behavioral model and the at least a portion of the program;

validate, after each execution, an expected behavior of the at least a portion of the program by executing test sequences constructed from the behavioral model, wherein the test sequences comprise model states and transitions;

perform model mutation using mutation operators, for creating a hypothesis of faulty program behaviors;

verify each faulty program behavior in the hypothesis using the model mutators; and assign a score to each faulty behavior, wherein the score comprises a percentage of executions of confirming sequences that match the faulty program behavior; and rank the scores for producing a ranked list of diagnoses, wherein the diagnoses correspond to the mutation operators.

20. The computer program product of claim 19 further comprising code that, when executed, causes a computer to:

present the ranked list of diagnoses to a user.

* * * * *